United States Patent Office 3,595,841
Patented July 27, 1971

3,595,841
DIIMINOSUCCINONITRILE AS A
VULCANIZATION RETARDER
David Apotheker, Wilmington, Del., assignor to E. I. du
Pont de Nemours and Company, Wilmington, Del.
No Drawing. Filed Mar. 14, 1969, Ser. No. 807,412
Int. Cl. C08f 27/06; C08c 11/40
U.S. Cl. 260—79.5                                           7 Claims

ABSTRACT OF THE DISCLOSURE

Vulcanization with sulfur of a sulfur-curable elastomer in the presence of zinc oxide and an accelerator belonging to the group of lead, cadmium, zinc and ferric salts of certain thioacids is retarded by diiminosuccinonitrile. The thioacids are di(lower alkyl) dithiocarbamic acids, O,O-dialkyl phosphorodithioic acids, and 2-mercaptobenzothiazole.

BACKGROUND OF THE INVENTION

The vucanization of unsaturated hydrocarbon elastomers by heating with sulfur is well known. Generally, the rate of vulcanization is quite low, and accelerators must be used to bring the vulcanization process within limits of practical operating conditions. However, many commercial accelerators increase the vulcanization rate so much that an elastomer stock may undergo premature vulcanization during processing and/or handling. Such active accelerators are said to lack processing safety.

Since premature vulcanization of an elastomer stock can create serious processing problems, it often is desirable to add to the elastomer stock a mild vulcanization inhibitor, which slows vulcanization sufficiently to permit safe processing and handling. Such an inhibitor is known as a vulcanization retarder. Vulcanization retarders usually are divided into two classes: those which are slightly acidic, such as certain carboxylic acids and anhydrides, and those which are derived from aromatic amines. The most prominent among those latter inhibitors in N-nitrosodiphenylamine.

Acidic vulcanization retarders generally are not effective at low concentrations, and at high concentrations they impair the desirable physical properties of cured elastomers. N-nitrosodiphenylamine, which is the only basic retarder of commercial importance, has excellent retarding properties when used at low concentrations in conjunction with certain accelerators. N-nitrosodiphenylamine, however, causes staining and discoloration of elastomer stocks in which it is used. There is, therefore, a need for a retarder which does not cause staining or discoloration of white or light-colored elastomer stocks.

SUMMARY OF THE INVENTION

It has been found that sulfur vulcanization of unsaturated hydrocarbon elastomers in the presence of accelerators such as lead, cadmium, zinc or ferric salts of certain organic, sulfur-containing acids can be efficiently retarded by incorporating in the elastomer stock about 0.1–2 parts by weight of diiminosuccinonitrile per 100 parts of elastomer. In this manner, a significant improvement in processing safety of the elastomer stock is obtained without adversely affecting the tensile properties of the final vulcanizate.

DETAILED DESCRIPTION OF THE INVENTION

Diiminosuccinonitrile can be readily prepared by reacting cyanogen and hydrogen cyanide under alkaline conditions at low temperatures. The product is a stable, white crystalline material, which melts at 166° C. Because the starting materials are cheap and the process is quite simple, diiminosuccinonitrile is a potentially cheap and attractive vulcanization retarder.

Unsaturated sulfur-curable hydrocarbon elastomers which can be vulcanized in the presence of both an accelerator and diiminosuccinonitrile include natural rubber; homopolymers, and copolymers of conjugated dienes, such as polybutadiene and polyisoprene, and styrene/butadiene copolymers; copolymers of olefins with conjugated dienes; and terpolymers of ethylene and propylene with a nonconjugated diene. Particularly suitable elastomers which can be vulcanized with sulfur in the presence of a conventional vulcanization accelerator and of diiminosuccinonitrile as a retarder are copolymers of butadiene with styrene (SBR) and terpolymers of ethylene and propylene with a nonconjugated diene having only one terminal double bond (EUDM elastomers). Representative terpolymers include those where the nonconjugated diene is 1,4-hexadiene, dicyclopentadiene, 5-ethylidene - 2 - norbornene, 5-methylene - 2 - norbornene, or 11-ethyl - 1,11 - tridecadiene. Mixtures of two or more different elastomers also can be vulcanized by the process of this invention.

The term "hydrocarbon elastomer" means an elastomer containing no elements other than carbon and hydrogen.

Diiminosuccinonitrile is effective as a retarder when used in conjunction with accelerators such as lead, cadmium, zinc or feerric salts of certain thioacids such as dialkyldithiocarbamic acids, O,O - dialkyl phosphorodithioic acids and 2-mercaptobenzothiazole. However, it is most effective with zinc salts of such acids. The most commonly used metal dialkyldithiocarbamates are those in which the alkyl radicals have 1–4 carbon atoms, for example, dimethyl-, diethyl-, and dibutyldithiocarbamates. Alkyl groups in metal dialkyl phosphoridithioates can have 1–18 carbn atoms, the preferred chain length being 3–5 carbon atoms. Either normal salts or basic salts can be used, and different metal salts can be mixed. Optionally, a small amount of an accelerator which is not a metal salt can also be present, for example, 2-mercaptobenzothiazole, 2,2' - dithiodibenzothiazole, or a tetraalkylthiuram disulfide.

The amount of accelerator in compositions of this invention varies with the elastomer, the amount of sulfur, the expected state of cure, etc., but in general is within the range 0.5–5 parts by weight of total accelerator compounds per 100 parts of rubber. Zinc oxide, which is an essential ingredient of the formulations, is present in the amount of 2–10 parts by weight per 100 parts of elastomer, 3–5 parts being preferred. Zinc oxide is believed to act as a vulcanization catalyst which regenerates the accelerator from its complex with sulfur.

The amount of diiminosuccinonitrile utilized in this invention, is 0.1–2 parts by weight per 100 parts of elastomer. At least 0.1 part is required to have any significant effect and more than 2 parts will have an adverse effect on the quality of the vulcanizates. No more of the retarder should be used than is required to obtain the desired processing safety. The preferred amount is 0.2–1.0 part per 100 parts of elastomer.

The amount of sulfur used in the vulcanization process of this invention can vary with the particular formulation and properties desired. In general, about 0.2–5 parts of slufur per 100 parts of elastomer is present.

The diiminosuccinonitrile is incorporated in the elastomer, along with sulfur, zinc oxide, vulcanization accelerators, and other compounding ingredients, using conventional rubber compounding techniques, for example, by compounding on a rubber mill. The conventional ingredients may include antioxidants, processing aids and diluents (such as plasticizers, softeners and extenders), carbon black, pigments, and fillers. The art is well aware of various techniques and materials employed in compounding elastomer stocks.

The invention is illustrated by the following specific embodiments thereof. All parts, percentages and proportions are by weight unless otherwise indicated.

EXAMPLE 1

Preparation of diiminosuccinonitrile

A solution of 22.5 g. of hydrogen cyanide, 19.4 g. of cyanogen, and 100 ml. of acetonitrile is cooled to −10° C. and 1 g. of dry potassium cyanide is added. After four hours at −10° C. to −5° C. the reaction mixture is cooled to −40° C. and filtered. The filter cake is washed with ice-cold water to remove potassium cyanide, leaving 22.0 g. of diimino-succinonitrile.

EXAMPLES 2–4

In the following examples compounded stocks are prepared on a two-roll rubber mill, using the compound recipes shown.

EXAMPLE 2

Vulcanization of SBR stock

The following stock is compounded:

TABLE I

| | Parts |
|---|---|
| Elastomer | 100 |
| Zinc oxide | 5 |
| Sulfur | 1.5 |
| Stearic acid | 1 |
| Fast extrusion furnace black | 100 |
| Medium thermal black | 60 |
| Naphthenic oil ("Circosol" 42XH, Sun Oil Company) | 60 |
| Zinc dimethyldithiocarbamate | 2 |
| 2-mercaptobenzothiazole | 1 |
| Diiminosuccinonitrile | (1) |

[1] See Table II.

The elastomer used is a copolymer of butadiene and styrene containing 23.5% polymerized styrene and having a Mooney viscosity (ML 1+4 at 212° F.) of 52. This elastomer is known as SBR–1500.

To show the retarding effect of the diiminosuccinonitrile, the Mooney scorch properties of the uncured stock are measured at 121° C. The testing is carried out by ASTM Method D 1646–61 using the small rotor. The retarding effect is evaluated by the length of time required for a 10-point rise in viscosity above the minimum reading (measured from the start of the test). The retarding effect is directly proportional to the length of time required for this 10-point rise to occur.

To show the quality of the vulcanizates obtained in the presence of the retarder, samples of the compounded stock are cured in a press at 160° C. for 5, 10, and 20 minutes. The stress/strain properties are measured by ASTM Method D412–64 T. In this and following examples the following abbreviations are used:

$T_B$=Tensile strength at break, p.s.i.
$E_B$=Elongation at break, percent
$M_{100}$=Modulus at 100% elongation, p.s.i.
$M_{300}$=Modulus at 300 % elongation, p.s.i.

TABLE II

| | Diiminosuccinonitrile | | | Control | | |
|---|---|---|---|---|---|---|
| Parts | 0.75 | | | 0 | | |
| Mooney scorch, minutes to 10-point rise | 30 | | | 23 | | |
| | Cure times (min.) | | | | | |
| Stress/strain properties: | 5 | 10 | 20 | 5 | 10 | 20 |
| $T_B$ | 1,250 | 1,620 | 1,690 | 1,630 | 1,725 | 1,820 |
| $E_B$ | 295 | 205 | 195 | 220 | 190 | 160 |
| $M_{100}$ | 425 | 720 | 860 | 710 | 900 | 1,100 |

Table II shows a retarding effect of diiminosuccinonitrile (time for a 10-point rise is 30 minutes, as compared with 23 minutes for the control stock). The stress/strain data show that the elastomer is not as well cured after 5 minutes in the presence of diiminosuccinonitrile as the control stock but that 10- and 20-minute cures in the presence of the retarder give a vulcanized elastomer which has physical properties nearly as good as those of the control sample.

EXAMPLE 3

Vulcanization of a mixture of SBR and EPDM elastomers

The stock recipe is similar to that in Table I, except that a different elastomer and different amounts of diiminosuccinonitrile are used. The elastomer consists of a mixture of 70 parts of SBR–1500 (same as in Example 1) and 30 parts of a copolymer of ethylene, propylene, and 1,4-hexadiene (EPDM elastomer) which is made in accordance with the general procedure of U.S. Pat. 2,933,480. The three monomers are incorporated in the proportions by weight of about 64.4% ethylene, 33% propylene, and 3.6% hexadiene by copolymerization in solution in tetrachloroethylene in the presence of a coordination catalyst made by mixing vanadium tetrachloride with diisobutylaluminum monochloride. The copolymer has a Mooney viscosity (ML 1+4 at 250° F.) of about 45. The degree of unsaturation is about 0.3 mole of ethylenic unsaturation per kilogram.

The changes in processing safety and the tensile properties of stocks containing two different levels of diiminosuccinonitrile and of control stock containing no retarder are shown in Table III.

TABLE III

| | Diiminosuccinonitrile | | Control |
|---|---|---|---|
| Parts | 0.25 | 0.5 | 0 |
| Mooney scorch, minutes to 10-point rise | 24 | 29 | 19 |
| Stress/strain properties, cure time, 5 min.: | | | |
| $T_B$ | 1,070 | 970 | 1,150 |
| $E_B$ | 160 | 155 | 130 |
| $M_{100}$ | 650 | 600 | 840 |
| Cure time, 10 min.: | | | |
| $T_B$ | 1,200 | 1,130 | 1,250 |
| $E_B$ | 130 | 120 | 100 |
| $M_{100}$ | 975 | 950 | 1,100 |
| Cure time, 20 min.: | | | |
| $T_B$ | 1,525 | 1,160 | 1,275 |
| $E_B$ | 110 | 100 | 100 |
| $M_{100}$ | 1,120 | | 1,230 |

This table shows that vulcanization of an SBR/EPDM elastomer mixture is retarded in the presence of amounts of diiminosuccinonitrile as small as 0.25 part per 100 parts of elastomer. The stress/strain properties of the vulcanized materials are quite close to those of the control samples cured for the same length of time. A better processing safety is thus achieved without sacrificing the physical properties of the elastomer.

EXAMPLE 4

Vulcanization of EPDM elastomer

The following stock is compounded:

TABLE IV

| | Parts |
|---|---|
| Elastomer | 1000 |
| Zinc oxide | 5 |
| Sulfur | 2 |
| Last extrusion furnace black | 100 |
| Medium thermal black | 60 |
| Naphthenic oil ("Circosol" 42XH) | 60 |
| Zinc stearate | 1 |
| Zinc salt of 2-mercaptobenzothiazole containing 10% inert hydrocarbon | 1.5 |
| Zinc dibutyldithiocarbamate | 3 |
| Diiminosuccinonitrile | (1) |

[1] See Table V.

The elastomer used is a copolymer of ethylene, propylene, and 1,4-hexadiene which is made in accordance with the general procedure of U.S. Pat. 2,933,480. The three monomers are incorporated in the proportions by weight of about 52.4% ethylene, 44% propylene, and 3.6% hexadiene by copolymerization in solution in tetrachloroethylene in the presence of a coordination catalyst made by mixing vanadium oxytrichloride with diisobutylaluminum monochloride. The copolymer has a Mooney viscosity (ML 1+4 at 250° F.) of about 70. The degree of unsaturation is about 0.3 mole of ethylenic unsaturation per kilogram. Processing safety and tensile properties of this EPDM elastomer containing three different levels of diiminosuccinonitrile and of a control stock which does not contain a retarder are compared in Table V.

TABLE V

|  | Diiminosuccinonitrile | | | Control |
|---|---|---|---|---|
| Parts | 0.25 | 0.5 | 1.0 | 0 |
| Mooney scorch, minutes to 10-point rise | 12 | 20 | [1]25 | 8.5 |
| Stress/strain properties, cure time, 5 min.: | | | | |
| $T_B$ | 1,625 | 1,320 | 835 | 1,520 |
| $E_B$ | 570 | 585 | 565 | 615 |
| $M_{300}$ | 1,025 | 770 | 460 | 910 |
| Cure time, 10 min.: | | | | |
| $T_B$ | 1,910 | 1,845 | 1,750 | 1,790 |
| $E_B$ | 390 | 435 | 430 | 410 |
| $M_{300}$ | 1,660 | 1,520 | 1,440 | 1,520 |
| Cure time, 20 min.: | | | | |
| $T_B$ | 1,920 | 1,800 | 1,750 | 1,810 |
| $E_B$ | 320 | 325 | 320 | 345 |
| $M_{300}$ | 1,860 | 1,940 | 1,680 | 1,710 |

[1] No change after 25 minutes.

Here again an increase in processing safety is observed with amounts of diiminosuccinonitrile as small as 0.25 part per 100 parts fo elastomer. The processing safety increases markedly when the concentration of diiminosuccinonitrile is double. The tensile properties of cured elastomer after 10- and 20-minute cures are in all cases virtually identical with those of the control sample. The properties after a 5-minute cure indicate that at the level of 0.5 and 1.0 part per 100 parts the samples have not yet reached their optimum state of cure.

The above Examples 2–4 show that increase in processing safety is obtained by compounding certain elastomer stocks with diiminosuccinonitrile without seriously affecting good mechanical properties of vulcanized elastomers.

I claim:
1. In a process for vulcanizing with sulfur 100 parts of a sulfur-curable hydrocarbon elastomer in the presence of about 2–10 parts of zinc oxide; about 0.1–5 parts of a vulcanization accelerator selected from the group: lead, cadmium, zinc and ferric salts of (1) dialkyldithiocarbamic acids in which the alkyl radicals have 1–4 carbon atoms, and (2) [(3)]2-mercaptobenzothiazole; and a vulcanization retarder, the improvement which consists essentially of employing as the retarder 0.1–2 parts of diiminosuccinonitrile, all parts being by weight.

2. The process of claim 1 where the accelerator is selected from the group: zinc dialkyldithiocarbamate, and zinc 2-mercaptobenzothiazolate.

3. The process of claim 1 where the sulfur-curable hydrocarbon elastomer is a terpolymer of ethylene, propylene, and a nonconjugated diene having only one terminal double bond.

4. The process of claim 2 where the nonconjugated diene is 1,4-hexadiene.

5. A composition comprising a sulfur-curable hydrocarbon elastomer, about 0.1–5 parts vulcanization accelerator and about 0.1–2 parts diiminosuccinonitrile, all parts based on 100 parts by weight of said elastomer.

6. The composition of claim 5 where the sulfurcurable hydrocarbon elastomer is a terpolymer of ethylene, propylene, and a nonconjugated diene having only one terminal double bond.

7. The composition of claim 5 where the nonconjugated diene is 1,4-hexadiene.

References Cited

UNITED STATES PATENTS

| 2,851,507 | 9/1958 | St. John | 260—780 |
| 3,357,957 | 12/1967 | Bromby | 260—79.5 |
| 3,382,219 | 5/1968 | Trivette | 260—79.5 |
| 3,496,152 | 2/1970 | Morita | 260—79.5 |

JOSEPH L. SCHOFER, Primary Examiner

C. A. HENDERSON, JR., Assistant Examiner

U.S. CL. X.R.

260—23.7, 41.5, 465.5, 780, 783, 785

PO-1050
(5/69)

UNITED STATES PATENT OFFICE
CERTIFICATE OF CORRECTION

Patent No. 3,595,841          Dated July 27, 1971

Inventor(s) DAVID APOTHEKER

It is certified that error appears in the above-identified patent and that said Letters Patent are hereby corrected as shown below:

Column 1, line 40, change "in" to -- is --.

Column 2, line 16, change "EUDM" to -- EPDM --;

line 27, change "feerric" to -- ferric --;

line 35, change "carbn" to -- carbon --;

line 64, change "slufur" to -- sulfur --.

Column 4, line 64, change "1000" to -- 100 --.

Column 5, line 33, change "fo" to -- of --;

line 35, change "double" to -- doubled --.

Column 6, line 8, delete "[(3)]".

Signed and sealed this 28th day of December 1971.

(SEAL)
Attest:

EDWARD M. FLETCHER, JR.          ROBERT GOTTSCHALK
Attesting Officer                Acting Commissioner of Patents